Aug. 23, 1927.
O. C. REEVES
1,639,811
WEIGHING SCALE
Filed Sept. 13, 1924
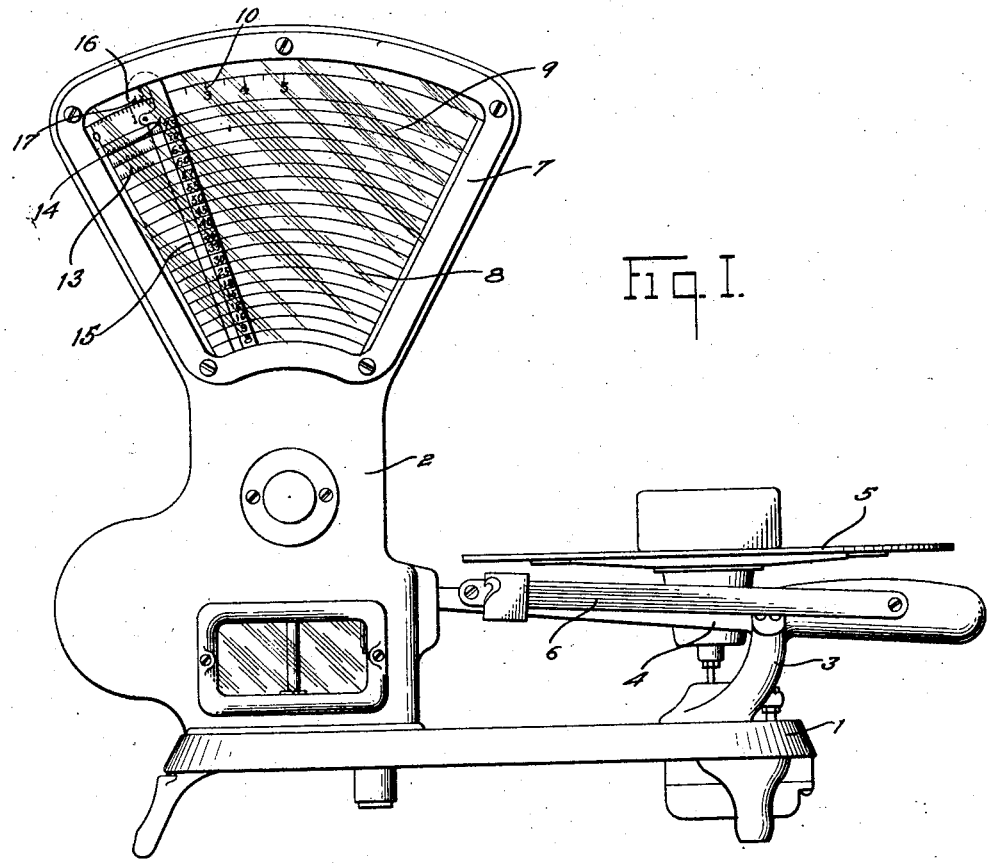
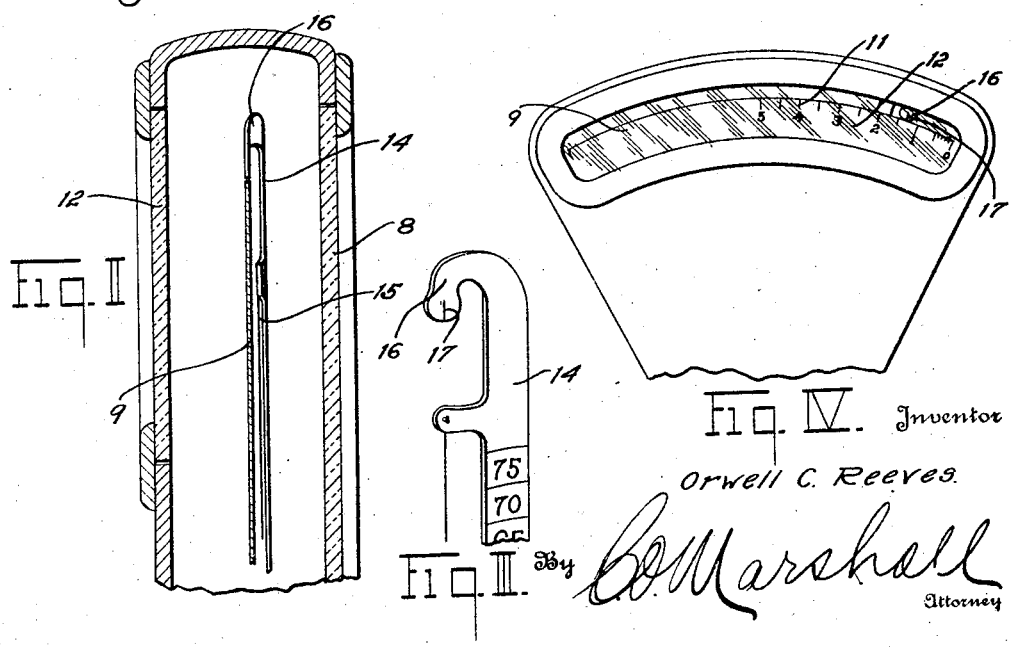
Inventor
Orwell C. Reeves.
By C. W. Marshall
Attorney Patented Aug. 23, 1927.

1,639,811

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 13, 1924. Serial No. 737,603.

This invention relates to indicators, and particularly to indicators for weighing scales, and one of its principal objects is to provide an indicating device in the use of which errors due to parallax occurring because of changes in the operator's position are avoided.

Another object is the provision of a device of this kind in which the indication may be read from either the front or rear side of the chart with the employment of a single indicating element.

Another object is the provision of an indicating device for a weighing scale having a chart and hand so arranged that the portions of said chart and hand co-operating to indicate weights lie in the same plane and may be read from either side of the chart, while the portion of the chart and hand co-operating to indicate computed values are visible only from one side of the chart.

Still another object is the provision of an indicating device which is simple and inexpensive to manufacture and which may be readily assembled without the use of special tools.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a fan type weighing scale embodying my invention;

Figure II is an enlarged fragmentary sectional view through a portion of the chart housing showing the position and relation of the indicating hand and chart of my invention;

Figure III is an enlarged fragmentary perspective view showing a part of the indicator hand per se; and Figure IV is a fragmentary rear elevational view as it appears when viewed from the rear of the scale.

Referring to the drawings in detail, the base 1 of the scale supports at one end an upright housing 2 and at its opposite end a fulcrum stand or base horn 3 upon which is pivotally supported a lever 4 which carries a commodity-receiving platter 5 and a beam 6. The nose of the lever 4 extends into the housing 2 and is operatively connected with the load-counterbalancing mechanism (not shown). The upper portion 7 of the housing 2 is preferably fan-shaped and is provided with a glazed window 8 through which an indicating chart 9 is visible. The upper portion of the chart in juxtaposition to the edge thereof bears a series of weight figures and weight graduations 10 on its front face and a similar series of figures and graduations 11 its rear face, the figures on the front of the chart reading from left to right, while those on the rear face of the chart read from right to left and are visible through a rear window 12, as indicated in Figure IV. The remaining portion of the front face of the chart 9 is occupied by concentric rows of graduations and value computations 13 such as are commonly employed on computing charts of this type.

The indicator hand 14 which co-operates with the chart 9 bears a series of price numerals, as shown in Figures I and III, each numeral of the series being arranged to swing over an appropriate row of computations on the chart 9, the hand being provided with an indicating wire 15 to indicate values by its position of registration with graduations on the chart. The upper extremity or tip 16 of the hand 14 is offset, as indicated in Figure II, so that it lies above and in the plane of the chart and swings along the curved periphery thereof, being visible from either side of the scale. Each side of the tip 16 of the hand is a radially extending mark 17 which serves as a pointer to indicate the weight of a load upon the scale platform by its condition of registration with the graduation below it.

Because of the fact that the portions of the surface of the hand bearing the marks 17 lie in the same planes as the surface of the chart, the apparent weight indication will be the same regardless of the position of the observer, and errors due to parallax are thereby avoided. Since no part of the chart lies back of this portion of the hand, there is no liability of its coming into contact with any portion of the chart in moving to indicating position. The device also provides an indication visible from the rear of the scale which is always identical with that visible from the front of the scale, and this result is obtained without the use of an additional indicating hand or a hook passing over the top of the chart, thus avoiding the liability, which always attends the employment of such devices, of rubbing against the chart or of the hands becoming out of alignment with each other and introducing inaccuracies in the weight indication.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a relatively movable chart and indicating hand, a portion of said chart lying back of a co-operating portion of said indicating hand, and a portion of said hand having a surface lying in the plane of and adjacent a surface of said chart the said surfaces of said hand and chart bearing co-operating indicia.

2. In a device of the class described, in combination, a relatively movable chart and indicating hand, a portion of said chart lying back of a co-operating portion of said indicating hand, and an offset portion of said hand having a surface lying in the plane of a surface of the chart and adjacent one edge thereof, the said surface of the chart co-operating with the said surface of the hand bearing weight indicia.

3. In a device of the class described, in combination, a relatively movable chart and indicating hand, a portion of said chart bearing value computations and lying back of a cooperating portion of said indicator hand, an offset portion of said hand having surfaces lying in the plane of the surfaces of the chart and adjacent one edge thereof, and a series of weight indicia adjacent one edge of said chart adapted to co-operate with indicia on the surfaces of offset portion of said indicating hand.

4. In a device of the class described, in combination, a housing, said housing having a front and rear window, a chart in said housing, one edge of which is visible through said front and rear windows, and an indicator having an offset portion lying in the plane of and adjacent the visible edge of said chart.

5. In a device of the class described, in combination, a housing, said housing having front and rear windows, a chart in said housing, a portion of said chart bearing value computations visible through the front window, weight indicia on both sides of a portion of the chart adjacent one edge thereof, said weight indicia being visible through the front and rear windows of said housing, an indicating hand having a portion adapted to co-operate with the value computations, and an offset tip lying in the plane of said chart co-operating with said weight indicia and visible through the front and rear windows of said housing.

ORWELL C. REEVES.